US009830378B2

(12) United States Patent
Stockton et al.

(10) Patent No.: US 9,830,378 B2

(45) **Date of Patent: *Nov. 28, 2017**

(54) SYSTEM AND METHODS FOR UNITS-BASED NUMERIC INFORMATION RETRIEVAL

(71) Applicant: Quantifind, Inc., Menlo Park, CA (US)

(72) Inventors: John K. Stockton, Redwood City, CA (US); Ari K. Tuchman, Palo Alto, CA (US)

(73) Assignee: Quantifind, Inc., Menlo Park, CA (US)

( * ) Notice: Subject to any disclaimer, the term of this patent is extended or adjusted under 35 U.S.C. 154(b) by 309 days.

This patent is subject to a terminal disclaimer.

(21) Appl. No.: 14/275,840

(22) Filed: May 12, 2014

(65) Prior Publication Data

US 2014/0250130 A1 Sep. 4, 2014

Related U.S. Application Data

(63) Continuation of application No. 12/496,199, filed on Jul. 1, 2009, now Pat. No. 8,756,229.

(Continued)

(51) Int. Cl.
*G06F 17/30* (2006.01)

(52) U.S. Cl.
CPC .. *G06F 17/30619* (2013.01); *G06F 17/30011* (2013.01); *G06F 17/3069* (2013.01);

(Continued)

(58) Field of Classification Search
CPC ......... G06F 17/30616; G06F 17/30675; G06F 17/3069; G06F 17/30696; G06F 2216/11; G06F 17/30011; G06F 17/30619
See application file for complete search history.

(56) References Cited

U.S. PATENT DOCUMENTS 5,809,502 A 9/1998 Burrows
5,911,138 A * 6/1999 Li .................... G06F 17/30398

(Continued)

FOREIGN PATENT DOCUMENTS

EP 1930816 A1 6/2008

OTHER PUBLICATIONS

Fontoura, Marcus et al., "Inverted Index Support for Numeric Search", Internet Mathematics; vol. 3, No. 2; pp. 153-185; A.K. Peters, Ltd.

(Continued)

*Primary Examiner* — Shiow-Jy Fan
(74) *Attorney, Agent, or Firm* — Irell & Manella LLP

(57) ABSTRACT

An information retrieval and analysis system for numeric data which provides high precision and recall for numeric search and uses a methodology for determining contextualization of the extracted data. The capabilities include extracting, parsing, and contextualizing numeric data including both a numeric value and an accompanying unit. This system facilitates the organization of largely unstructured numeric data into an inverted index and other database formats. An information retrieval system which enables the exploration and refinement of an extracted numeric data set defined by a search input that may be precise or initially vague. This system also facilitates analyzing and portraying numeric data graphically, creating knowledge by combining data from multiple sources, extracting correlations between seemingly disparate variables, and recognizing numeric data trends. This system uses local natural language processing, mathematical analysis, and expert-based scientific heuristics to score the numeric and contextual relevancy of the data to the query parameters.

12 Claims, 6 Drawing Sheets

300
Numeric Search
305
310
320
330
325
335
340
315

Related U.S. Application Data

(60) Provisional application No. 61/220,617, filed on Jun. 26, 2009.

(52) U.S. Cl.
CPC .. *G06F 17/30616* (2013.01); *G06F 17/30675* (2013.01); *G06F 17/30696* (2013.01); *G06F 2216/11* (2013.01)

(56) References Cited

U.S. PATENT DOCUMENTS 5,950,189 A * 9/1999 Cohen ................. G06F 17/3069
6,067,543 A 5/2000 Burrows
6,704,728 B1 * 3/2004 Chang ............... G06F 17/30321
6,714,933 B2 3/2004 Musgrove et al.
7,024,387 B1 * 4/2006 Nieboer ................. G06Q 40/00 705/313
7,197,479 B1 3/2007 Franciscus de Heer et al.
7,246,110 B1 7/2007 Musgrove et al.
7,461,064 B2 12/2008 Fontoura et al.
7,509,314 B2 3/2009 Hamaguchi
7,693,824 B1 * 4/2010 Diament ........... G06F 17/30011 707/999.003
2002/0073115 A1 6/2002 Davis
2003/0225779 A1 12/2003 Matsuda
2004/0162827 A1 * 8/2004 Nakano ............. G06F 17/30675
2004/0167889 A1 * 8/2004 Chang ............... G06F 17/30321
2005/0138024 A1 6/2005 Doerre et al.
2006/0031183 A1 2/2006 Oral et al.
2006/0074962 A1 4/2006 Fontoura et al.
2007/0011151 A1 1/2007 Hagar et al.
2007/0073668 A1 3/2007 Stephan
2007/0174238 A1 * 7/2007 Sareen .............. G06F 17/30864
2007/0185870 A1 * 8/2007 Hogue .............. G06F 17/30905
2008/0066052 A1 * 3/2008 Wolfram ................... G06F 8/30 717/109
2008/0140639 A1 6/2008 Doerre et al.
2010/0299332 A1 * 11/2010 Dassas .................. G06F 17/245 707/741

OTHER PUBLICATIONS

ISR of the International Searching Authority dated Apr. 20, 2011 in corresponding International Application No. PCT/US2010/040024, filed Jun. 25, 2010.

* cited by examiner

SYSTEM AND METHODS FOR UNITS-BASED NUMERIC INFORMATION RETRIEVAL

This is a Continuation of and claims priority under 35 U.S.C. §120 to prior U.S. Non-Provisional patent application Ser. No. 12/496,199, filed Jul. 1, 2009, entitled, "SYSTEM AND METHODS FOR UNITS-BASED NUMERIC INFORMATION RETRIEVAL," which in turn is a non-provisional of and claims priority under 35 U.S.C. §119 to U.S. Provisional Patent Application Ser. No. 61/220,617, filed Jun. 26, 2009, entitled, "System and Methods for Units-Based Numeric Information Retrieval." The entire contents of the aforementioned applications are hereby incorporated by reference.

BACKGROUND

Information retrieval plays an increasingly prominent role both in academic and industrial scientific research but currently suffers from a lack of numeric search capability in general and a lack of numeric data extraction from unstructured data specifically. Since an estimated 95% of all of the information currently on the web is "unstructured," sophisticated information extraction techniques are required to transform such content into usable data. A challenge in extracting numeric data from unstructured documents is that in addition to locating the keyword or numbers corresponding to the query parameters one must be able to intelligently contextualize that data in order to use it. Even with structured data, contextualization and visualization of results remains a challenge. The need for such an information retrieval system is supported by the fact that numeric data represents one of the most valuable subsets of information on the internet, including financial statistics and technological specifications.

Enhanced numeric search capability may be implemented at several levels. At a low level, existing search tools need to be augmented with more refined recognition of numeric notation and unit conversion. At a high level, certain systems aim to semantically identify, and make searchable, all concepts within unstructured documents. Given that this is a difficult, if not impossible, long-term goal, there exists an immediate need for systems of intermediate capability, which build in low-level broad numeric capabilities, but necessarily stop short of full contextualization. Further, many search queries do not have singular answers and are not suited to systems claiming to have achieved full recognition of meaning and context. Such queries are more properly answered with numeric distributions, with inherent width and transparent uncertainty. Thus there is a need for exploratory models of search particularly suited to the unique nature of numeric, as opposed to linguistic, information.

SUMMARY OF THE INVENTION

Aspects of the invention include an information retrieval system for numeric data that utilizes a units-based index construction process and provides efficient numeric data extraction and contextualization. Additional features include automated graphical display and mathematical analysis of retrieved data. In an exemplary embodiment of the invention, an indexer module extracts numeric data from a set of source documents, preferably including unstructured and semi-structured, technical and non-technical sources. The indexer converts number-unit pairs from natural text or tables into number-unit tokens, while recognizing the equivalence and conversions of certain units, and parses arbitrarily complicated strings of numbers and units to a standardized and easily searchable notation. Various additional metadata, including the original form of a unit's expression, significant numeric digits, frequency of occurrence and contextual tags can be stored with this number-unit pair to enhance retrieval capabilities. Contextual tags can be generated using natural language processing techniques, and an expert knowledge library of ontologies and heuristics can be utilized to optimize both scientific and non-technical unit identification and classification. This library can be comprised of relations and data either manually entered or extracted from large document corpora using machine-learning techniques, including from the indexing process itself. In addition, keywords from each source document are also stored in the index with positional information, using traditional keyword indexing techniques.

In a further exemplary embodiment, a query module parses a user-defined query to search for the expressed units and numbers as well as all scientific and semantic synonyms and numerically similar expressions. A scoring algorithm, which considers local keywords, numeric ranges and global keywords, is used to retrieve the relevant data-point based on appropriate query relevancy, including contextualization of the data. Numeric scoring employs a functional curve-fitting technique, which extracts features from a distribution of possible relevant data-points, and calculates data relevancy based on the location of these spectral features as well as their properties such as feature widths.

In a further exemplary embodiment, results from the query can be graphically represented to the user. Data hits can be plotted in multiple formats including histograms, 2D plots comparing numeric data from multiple searches, as well as plots of numeric data as compared to various metadata associated with the origin document of the numeric data. This graphical representation facilitates user visualization of trends in the data, correlations between multiple data sets, and outlier points. Information extraction procedures can be used to tag the distribution (and its composite points) with keywords, markers, and metadata that identify clusters and trends. Furthermore, this interface enables a user to provide feedback to the search with graphical interaction tools to refine the scope of the retrieved information.

DETAILED DESCRIPTION OF THE INVENTION

I. Index Creation

In a preferred embodiment, a numeric search system employs an index building process and structure appropriate for quantitative entities. As contrasted with generic keyword indexing schemes, the indexing process described herein utilizes additional computing resources, both for numeric index creation and storage, to achieve improved quantitative search retrieval time and performance. Here we describe a method for converting quantities found within natural language text into an index format that respects equivalencies between a wide array of number and unit-of-measure representations and conversions and enables efficient numeric search with high precision, recall and contextualization. Natural language text comprises many forms, but does not include fully structured relational databases.

A single number-unit pair can have an effectively infinite number of equivalent forms of expression, due to the variation in both the numeric format and the unit representation. Furthermore, numerically similar terms can often be considered to be functionally equal, depending on the desired precision of the user application and the distributions of the relevant numeric values within a corpus. These distinguishing properties of numeric quantities, among others, significantly impact the search endeavor, from index creation to the retrieval and representation of results.

Indexing Process

Figure 1:
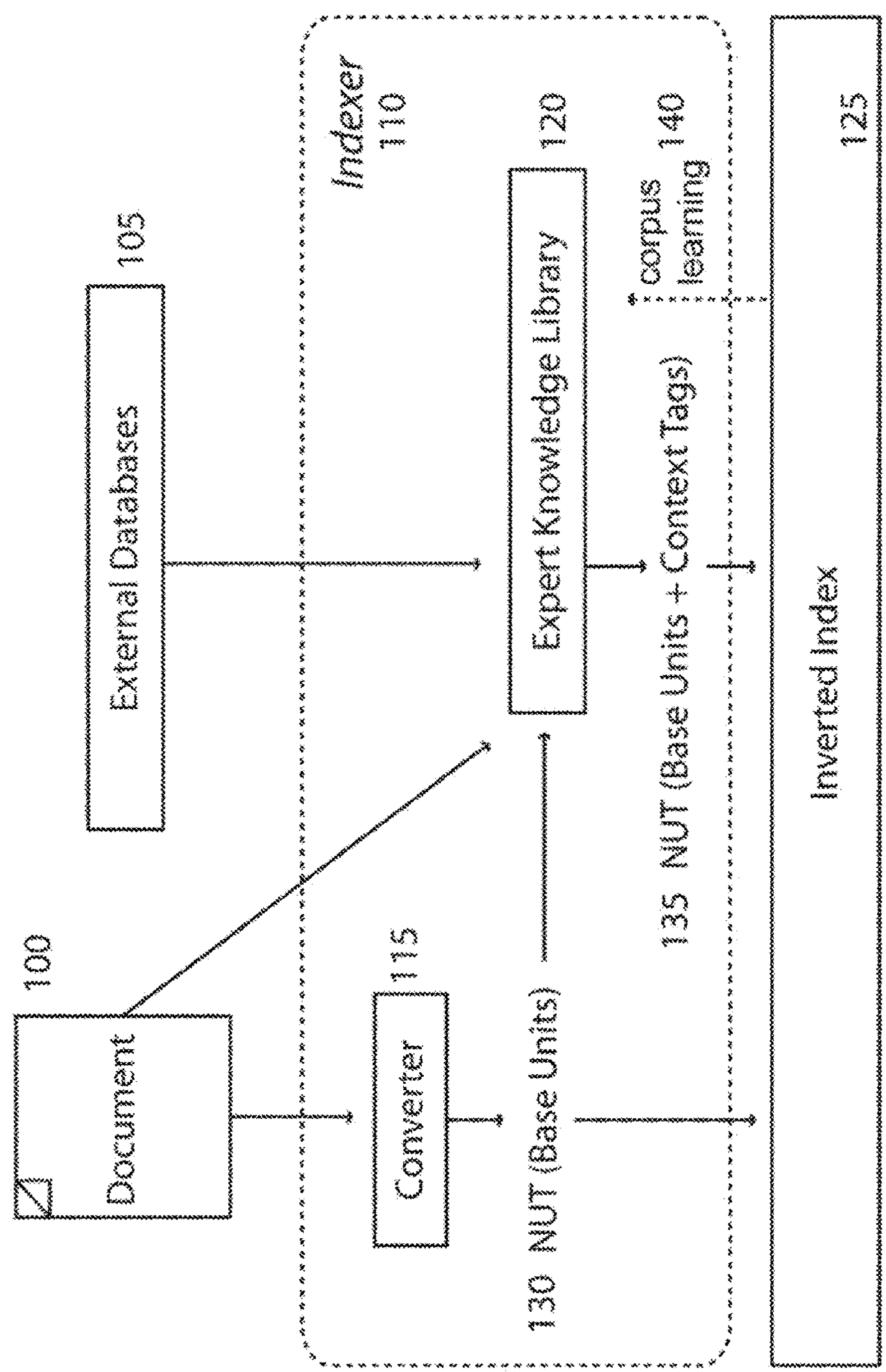
FIG. 1: A schematic for the process of index construction in accordance with one embodiment of the present invention.

The indexing process, performed by indexer 110, as illustrated in FIG. 1, begins with the recognition and conversion of numeric quantities within unstructured text in a corpus of source documents 100. For example, if the string "the wavelength is 8520 angstroms" appears within a document 100, then converter 115 will recognize and convert both the numeric and unit part of the entity into a base format (e.g., 8.52e-7 meters). This process necessarily utilizes cues to recognize the beginning and end of the quantity string embedded within a given sentence. Converter 115 preferably recognizes quantities of the form "number-string+unit-string" or "unit-string+number-string" (such as "$50.00"), or more complicated expressions including different orderings or spacings. The numeric string may be a complicated series of mathematically related substrings. Similarly, the unit string may be a complicated series of unit substrings that may be combined into a reduced dimensional form. The quantity string may comprise a mixture of numeric and unit strings, for example, "number+unit+unit+number+unit" and mathematical operators may also exist within either type of string (e.g., "/", "per", "x"). Changes in typeface can also be recognized to properly generate the index. For example, converter 115 recognizes powers represented as superscripts ($10^7$). Changes in case are also recognized to properly generate the index. For example, converter 115 recognizes that "mW" corresponds to milliwatts and "MW" corresponds to megawatts. Converter 115 recognizes the extent of a quantity string, converts the complicated string to a simple "number+base unit" format, or number unit token (NUT) 130, while respecting the intended mathematical relationships. These recognition and conversion techniques may include simple word type recognition or more advanced natural language processing methods. Note that this same conversion process can preferably also be used on the query input side (discussed in more detail below in Section II, "User Interface"), such that the user can enter quantities as they would be written in a text, with the resolution to base formats performed in a manner that is hidden from the user.

Quantities can be extracted from documents both from in-line natural language text and also from tables and charts. These cases are different in that the number and unit may appear spatially close together if within a single line of text, but may appear apart within a table, with the unit written in a column heading and the number located within the body of the table. For this extraction application, the indexer 110 will use a different series of extraction rules, based, for example, on html table tags in order to create the index 125.

The converter 115 will convert NUTs 130, identified by the indexer 110, with dimensionally equivalent units to the same base format within the index. For example, the NUT stored in the index can be expressed in the base unit of meters, even if the quantities were originally expressed in other units. Thus, the quantities ("1 cm", "10 millimeters", "0.01 meters", "$10^8$ angstroms", "$10^{13}$ fermi") will all be associated with at least one index representation that treats them equivalently. Although many choices for base units are possible, the examples here use standard SI units (meters, kilogram, seconds, etc.).

A large portion of quantities will be simple countable objects or nouns (apples, people, etc.), which cannot be reduced to standardized units. In these cases, converter 115 can use synonym dictionaries and other NLP techniques to determine how to convert quantities. For example, "5 planes are flying" and "the number of aeroplanes is five" can both be converted to equivalent NUTs with a base representation in the index equivalent to "5 airplanes".

The number-based indexing system as described herein lends itself to information retrieval across multiple languages. Whereas artificial intelligence algorithms for natural language processing are often language-nuance intensive, and may therefore map poorly onto foreign languages, numeric units are relatively standard across international lines.

Basic Index Structure

The conversion method involves mapping the quantity attributes into a keyword-like format, in the form of NUTs, that allows efficient alphanumeric range queries and other typical search functionality. Each quantity expressed in the original text may be stored in a series of NUTs with different levels of information to enable efficient queries. Each quantity may also be stored with positional and punctuation information to provide context with nearby keywords, phrase queries, and span queries. Each quantity may also be stored as a NUT with a payload 135 comprising any additional information such as document metadata and ontology tags extracted from an expert knowledge library 120 and external databases 105. This extra information may be attached as a payload to the NUT within the index, or stored as a separate token with the same positional information. This information may be used by a scoring module 225 as described below. Keywords are also stored in the inverted index 125 using traditional keyword indexing techniques and may also be stored with payloads comprising additional information such as positional and contextual information, including metadata and ontology tags. These keywords and their additional accompanying information may also be used by a scoring module 225.

In one embodiment, the quantity is structured in the index 125 as follows. The string "50.0 kilometers" can be converted into the NUT "u_m1_p04_v5.00_x" 135. Here "u" starts the string to indicate a quantity type. The substring "m1" indicates the unit type (meters to the power 1). The substring "p04" gives the base-10 exponential power (assuming a max of $10^{100}$) of the number. The substring "v5.00" gives the value to multiply by the base 10 power.

The substring "x" here represents additional information (akin to a payload) extracted from the source document—such as the "contextual tags" described below—that can subsequently be utilized in assessing the contextual relevance of a given NUT to a query. Multidimensional quantities with a combination of units such as "2.5 km/ms" can be similarly recorded as "u_m1_s-1_p06_v2.50_x", with the order of units always appearing in a predefined order (e.g., alphabetical). For negative exponents, the representation may appear as follows. The quantity "3.10 mm" is turned into the token "u_m1_m97_v3.10". Here the exponent power is given by "m97", where "m" indicates the minus type and "97" encodes the −3 exponent by the convention "100-(−exponent)". Values smaller than $10^{-100}$ are not considered in this particular scheme. In another example, "1.00 angstrom" goes to "u_m1_m90_v1.00".

This encoding is chosen so that the positive and negative exponent quantities have an alphabetical/alphanumeric ordering that corresponds with the numeric ordering. This enables alphanumeric range-queries to function equivalently to numeric range queries given the appropriate prefix. Such an approach appropriately orders the keyword quantity by unit first. This approach is easily adapted to pre-existing indexing frameworks with internal support for keywords only.

This compact exponential representation, and other similar formats, is convenient and well suited to search because it typically corresponds with the needs of the user performing a numeric query. Users are often not concerned with more than a few significant digits in their search. For example, a user searching for "$100,000" would likely conclude that a NUT with value "$100,001" should be considered a hit as well. Thus, for indexing many data corpuses it often makes sense to round quantities. Another scheme to search for integers could keep all numbers from 1 to 1e10, requiring 1e10 possible tokens. To effectively capture the same range, the above encoding (in base 10 for integers keeping only one significant digit) would only require approximately 10 (orders of magnitude)×10 (values for each order)=100 total tokens (i.e., of order the number of significant digits multiplied by the logarithm of the range). Although some precision is lost, this encoding is effectively the same with much more efficiency. Techniques for retaining exact precision are described below.

Alternative indexing methods include different pre-set formats (e.g., using base-2 rather than base-10 for the exponentiation). The precision of the numeric representation can also be adaptively determined based on the distribution of numbers that appear in a document set rather than with pre-set spacings.

Layered Indexing of NUTs

A layering scheme using NUT redundancies stored by the Indexer can also be implemented to improve the efficiency of certain types of numeric queries. For example, the Indexer could covert the quantity "pi kilometers" into multiple NUT representations with layers of increasing precision.

u0_m1_p03
u1_m1_p03_v3
u2_m1_p03_v3.1
u3_m1_p03_v3.14
. . .

where each NUT is constructed with a prefix corresponding to the degree of significant digits stored. This chain could be stopped at a predetermined level or at the stated level of precision in the text as the indexer will not record NUTs with more precision than originally represented.

Beside these tokens, other simple tokens can also be added to the index for the purpose of aiding certain processes. For example, for "5 inches" the NUT "u_m1" may be added in parallel, to indicate an instance of a meter (length) entity alone. In this way, one can use a span query between a local keyword and unit type without specifying the unit's value. Filtering by the value of the actual length can occur later in the query and scoring process.

At a minimum, all quantities containing standardized units can be stored in their dimensionally reduced form involving only a few units, including kilograms, seconds and meters. While this is helpful in flattening and improving search recall, it may remove initial contextual information. For this reason, the system can additionally include a string that encodes the quantity not converted into a base unit. For example, the quantity "1000 inches" would convert to two distinct NUTs: "u_in1_p03_1.00" and "u_m1_p01_2.54." Alternately, this information could be stored in a payload of the indexed entity. The stored information should at least include the original and base unit representations, where other unit conversions could be calculated by input converter 205, rather than processed and stored by the indexer 110. For example, if a source document includes a reference to "12 ft", index 125 redundantly stores a NUT with the original expression "12 ft" as well as a NUT with the base standardized unit of "3.658 m." Significant figures in the converted unit can be maintained during index creation at a level corresponding to the original notation. For example, in the case of "12 ft," which has an implied uncertainty (in a preferred embodiment) of 1 ft, the expressed unit in base notation has a corresponding uncertainty of 0.3 m, and thus saving the converted unit as "3.66 m" should more than suffice.

Additional formats can be used to index other numeric entities than just a single quantity. These include ranges found within the text (e.g., "the process takes 5 to 10 years") or approximate values with error bars (e.g., "6+/−2%"). In the latter case the precision may be implied by the number of significant digits given and can also be encoded as an additional payload value.

The indexer 110 can also record additional instances of the NUT containing, for example, the error bar information (a number or set of numbers with the same units representing the uncertainty about the principal value). For multiple instances of NUTs with the same unit in a given document, their order of appearance could be stored by appending "n1," n2," etc. to assist in their retrieval and scoring.

These indexing methods can be applied to other diverse numeric entities including chemical identifiers and equations.

NUTs with Context Tags Based on Expert Knowledge Library

Figure 2:
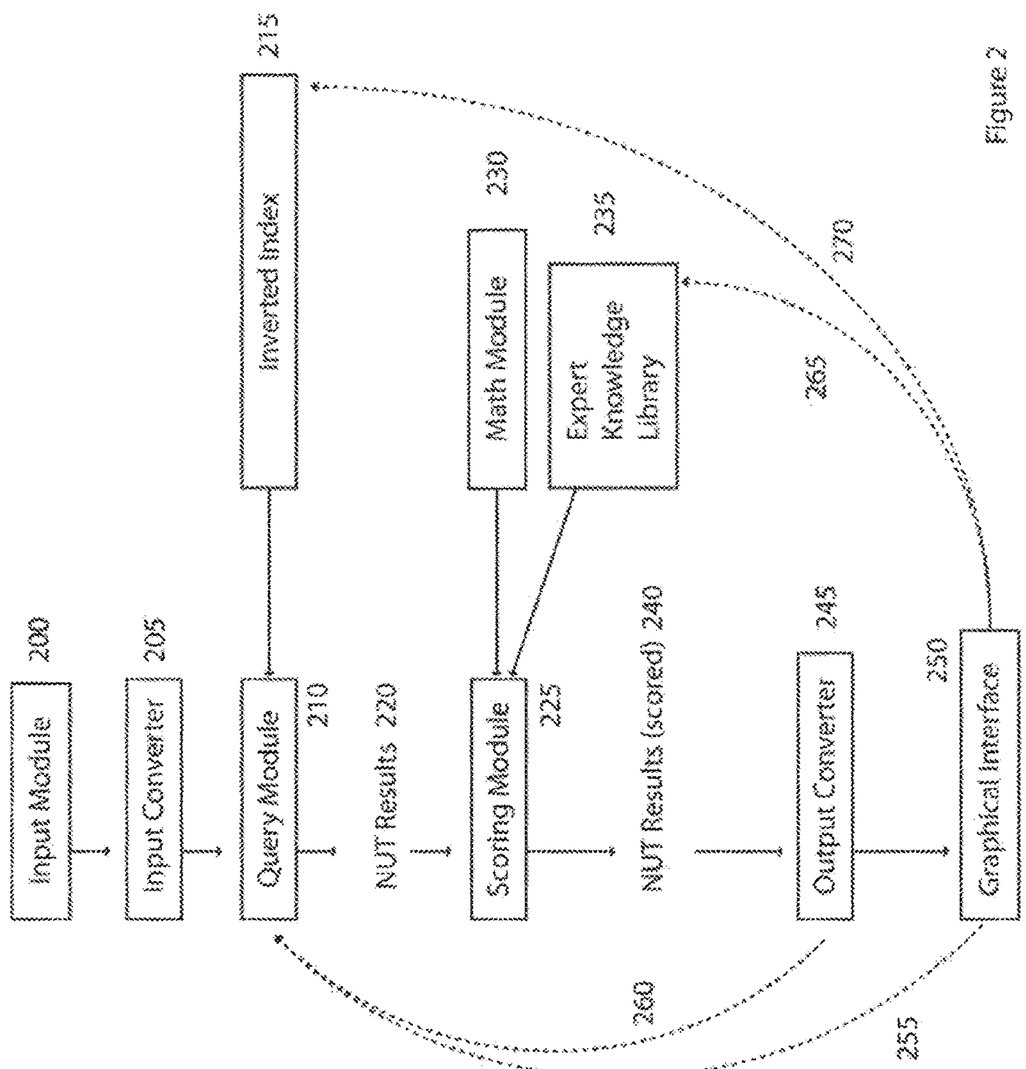
FIG. 2: A schematic for the process of how a query is entered, parsed, evaluated and retrieved in accordance with one embodiment of the present invention.

Contextualization of NUTs can be determined though a scoring process as described below in cooperation with search parameters entered into input module 200 (FIG. 2). However, this process can also be made more accurate with preprocessing of the NUT during index construction with the aid of scientific and technical heuristics. Expert scientific knowledge of contextual information such as of a specific technology, device or quantitative attributes can be leveraged to enable the precise contextual identification of a NUT.

This technical information can preferably be stored in an expert knowledge library 235 as a series of heuristics along with detailed ontologies. Expert knowledge library 235 contains information which is topic specific and highly technical. In medical applications, for example, ontologies might describe the relationship between specific diseases, symptoms and treatments. As another example, the quantity "1064 nm," the wavelength of a popular laser, is more likely to be referring to a wavelength in a document than the quantity "1074 nm," which is not associated with a popular laser, and may be referring to a different type of length.

The library information can be hardcoded by expert professionals as well as be added to by statistical natural language processing (NLP). Such NLP approaches employ Bayesian estimation and machine learning of quantity-value distributions to infer the likelihood of a keyword being associated with a quantity. This learning can occur both in the process of the information retrieval system performing actual searches as well as during a separate, training stage. Correlations between NUTs in a given numeric range and relevant keywords that are learned can be automatically entered into the expert knowledge library or suggested for storage in the Library, preferably after approval by an expert editor.

Knowledge stored in the library includes relatively low level properties which correspond to a NUT's original form of expression, including the units of expression for a given quantity in different scientific fields. For example, physicists often express energy in Joules and several subspecialties of chemistry prefer electron volts as their units of choice. Therefore the scientific field of a document can often be inferred by its unit expression.

Higher level heuristics, which can be used to provide and evaluate contextual tags for NUTs might include the following for biomedical applications:

1. Check the scientific consistency of units with nearby words used to describe them. For example, body surface area for dosage calculation should be quoted in units equivalent to m2 not m (dimensional analysis).

2. Check that a number does not exceed expected physical bounds (technical or fundamental) for that unit. For example, normal human white blood cell counts are between 4×109 and 11×109 per liter of blood.

3. Check that a quantity is not specified to many more significant digits than typical for values of that unit. For example, normal human creatinine levels range between 0.5-1 mg/dL and are not quoted to more than two significant digits.

Such expert knowledge can be used to provide information for the payload in redundant listings of NUTs in the index. For example, each NUT 135 can be associated with a suffix tag that reflects a contextualizing keyword and stored in a new iteration with this context tag. Adherence to heuristics such as those above will help determine the goodness of fit of a context tag to a NUT, where different tags considered will have their own set of constraining heuristics.

These rules can also be used to error correct the extraction process itself. For example, if an ambiguous numeric notation is used with two different numeric interpretations (due to a possible technical formatting issue), the known typical ranges for the given unit can be used to disambiguate and extract the probably correct value.

The rules and ontologies within the library described in this section can also be informed by the performance of latent semantic analysis (LSA), described further below. In short, the system may learn from a document corpus 140 which concepts and keywords are associated with particular quantities (or quantity ranges), by adapting the keyword techniques of LSA to include quantity (and quantity range) tokens as keyword-like entities.

II. User Interface

Input Module and Query Module

An exemplary input module 200 for this system includes input fields for keywords, which may be either local to a NUT or global in a document, or both, as well as the numeric and unit constraints for the search. The query process begins, as detailed in FIG. 2, with input module 200 receiving a user query that includes numeric and textual query constraints.

Numeric parameters specified in the user's query may comprise only a single quantity, with the results in that case preferably either returning all exactly equivalent quantities or quantities within a local range near that quantity. The range can be a user-specified or predetermined parameter, or can be intelligently determined (e.g. based on heuristics). Alternatively, the range could be explicitly requested, with the user entering two quantities and the system returning documents containing values within that range. In the numeric fields, the user may specify the quantity or ranges in a variety of numeric formats and input converter 205 will convert these to base representation, as was done by indexer converter 115 in creating the index 125. Input converter 205 converts both the unit expression and the number specified in each query to a standard format. Every standard scientific unit has an underlying base quantity, such as length, time, mass, charge, etc., and for each such base quantity a standard unit is chosen that will serve as the search standard used by query module 210. For example, if a query specifies "12 ft", that query is processed by query module 210 as being a query for "3.66 meters" after the unit conversion is performed by the input converter 205. In addition, in each query the numeric constraints entered into input module 200 can be rounded automatically by the input converter 205 to a given precision or can be user defined. Thus a wide range of both input units and numeric formats are preferably accepted by input module 200, including all mathematical operators and number representations (pi, e, etc.). The user can preferably choose to view output results converted and expressed in the same unit entered into input module 200. Conversion into base units and reconversion back to preferred units (performed by the output converter 245) can thus be hidden from the user.

For example, in a preferred embodiment, query module 210 will process a query with numeric and keyword constraints. The precision of the numeric values of a NUT deemed relevant to a user's query can preferably be user-controlled through the interface. In addition, multiple numeric query types can be entered into input module 200, including, but not limited to, a search for "780 nm," a value within 10% of 780 nm, a numeric range of values from 770-790 nm, or a value which lies within 1 standard deviation of 780 nm, where a standard deviation of the wavelength distribution can be extracted from the corpus as described below.

In an exemplary embodiment, one or more keywords can be entered into input module 200, thereby adding loose semantic constraints to the numeric search parameters. Input module 200 accepts a keyword for local contextualization of the NUT and accepts a global keyword to determine the relevancy of the document to the query. The proximity of a local keyword (or a semantic match thereof) to the occurrence of the NUT within the source document text should be a factor in determining the perceived relevancy of the NUT; for a global keyword, however, proximity of the keyword to the NUT within the text of the document is not necessarily pertinent to relevance. For example, a NUT of "3 microns"

might occur proximate to the term "wavelength" in the source document, which could match the desired local keyword. However, this source document might generally be discussing environmental isotope monitoring, whereas the user is actually interested in documents focused on human breathalyzer applications. Thus, both local and global keywords are preferably used to ascertain query relevant contextualization of the NUT.

The intention of the local and global keywords can be reflected by their introduction in input module 200. For example, input module 200 can label the input fields as:

Search for values of [local] [keyword] in the range [min] to [max] of units [unit] in documents about [global] [keyword], where a boxed term denotes an input field.

Input module 200 can also be generalized to retrieve multiple quantities whose relationship may be independent or dependent. Unlike generic keywords, NUTs can easily be combined arithmetically to make new quantities. For example, input module 200 preferably allows the user to request documents containing, e.g., two NUTs each satisfying different constraints, where the ratio of their numeric values is greater than a specified bound and less than another. This feature provides powerful functionality similar to the complex queries that are possible with advanced structured database languages, but does so with unstructured documents. Arbitrary functional relationships and mathematical constraints between retrieved quantities may be defined beyond the usual Boolean operations associated with keyword search.

Data-Centric Approach

The data-centric approach of the present invention facilitates powerful and innovative formats for visualizing and interacting with search results, including graphical representations of retrieved numeric information that indicate trends, clusters, and correlations.

Output Display

The output display preferably includes a textual region and a visual graphical region. The graphical region can include the user's preferred representation of the visual results as well as controls for altering it. The text region may include a summary of the retrieved documents including a list 315, with metadata 310, and the number of documents/instances retrieved. The text region may also include a sub-region that reveals the metadata for a specific document selected. Common word lists from both the full search results 335 and a selected point's document 340 can be included.

Figure 3:
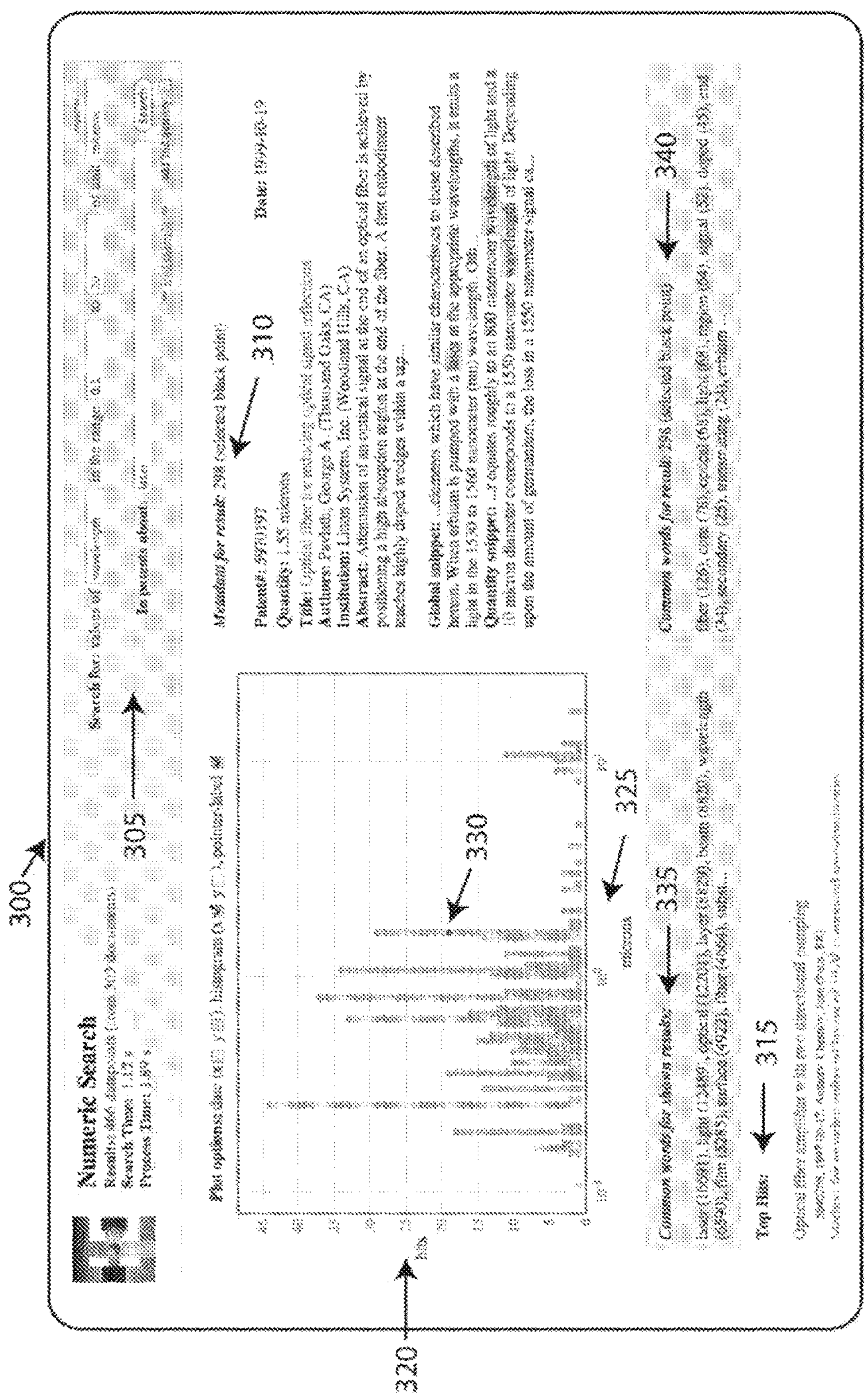
FIG. 3: An example interface of the information retrieval system including input and output templates in accordance with one embodiment of the present invention.

The numeric format employed in our information retrieval system enables unique forms of graphical representation. With the graphical representation of a preferred embodiment, data markers are organized and presented on a screen in a compact, logical manner as contrasted with list-based textual representation of search results. An exemplary graphical interface 300 is depicted in FIG. 3. For example, each retrieved NUT can be plotted as a data-point 330, with the value determining the location on one axis 325 of the graph display and the other axis 320 representing a histogram of the number of instances that a NUT with the correct numeric value appears. Alternatively, the histogram can correspond to the number of documents where the match appears. Optimal binning for histogram plotting can be determined either as a function of the queried range or as a function of the results. Binning choices can be automated based on these conditions or can be selected interactively by the user.

In another display embodiment, the NUT value can determine the position along one axis 320, while another number/metric can determine the position along the other axis 325 or axes. This other number/metric can, for example, be extracted from additional metadata for the NUT, such as the publication date of its source document. In addition, multiple number-unit pairs can be plotted against each other. For example, a search can be performed for documents which contain multiple number-unit pairs and then each data-point plotted indicates a document which matches both numeric searches. In this embodiment, multiple numeric constraints as described above can be imposed on each unit. This mode of representation provides a depiction of correlations between different variables.

The graphical output format can include scatter plots, histograms, and other graphical formats. The output display can occur in single or multiple dimensions (1D, 2D, 3D and so on). All of these formats will provide the potential for user-visualized numeric spectroscopy to allow the user to recognize trends, outliers, correlations and clusters and to allow the user to interact with the results.

The output graph is preferably interactive, including typical interactive features such as zooming, choosing which quantities map to which axes, and mouse-over highlighting. The user can adjust the data ranges of the graph by clicking on the appropriate axis and can toggle between plotting options, such as between histogram plotting and plotting by date.

The particular graphical representation of each data-point (or marker), beyond the position of the marker on the graph, can encode additional information about the corresponding NUT. For example, visual representations of the plotted data-points can reflect the scoring attributed to each NUT by scoring module 225; thus, a larger sized data-point can indicate a higher score, or the color of each data-point can be correlated with its score. Similarly, the color of each point can be correlated with the source database hosting the document from which the corresponding NUT was extracted, for searches involving multiple distinct document databases; thus, for queries of a patent database, hits from the USPTO might be plotted in one color, and those from international patent filings plotted in another color. Alternatively, data-point color, size, transparency and shape can each be used to reflect other metadata, including the relevancy score of the point.

For found numeric types which represent more than a single quantity, alternate graphical representations may be used. For example, a range quantity ("5-10 years") may be represented by a dumbbell marker (with two dots connected with a line). Alternately, a single quantity with error bars ("6+/−2%") can be represented by a point with a line spanning the given range.

The graphical axes can be linear or logarithmic, with controls that automatically or manually switch between the two options. For example, a logarithmic spacing allows a large dynamic range of points across many orders of magnitude to be displayed with visual clarity.

For a given query, a single document can contain many relevant quantities and hence produce multiple markers in the output visualization. For example, if a length quantity is quoted twice within a document and both quantities sufficiently match the other search criterion (range, context, etc.), then these two points will appear in the result as distinct markers with distinct local context (snippets), but shared global document metadata. This reflects the data-centric approach in preferred embodiments of the present invention.

The graphical interface 250 may relate information from the graphical region to additional information presented in the text region. Thus, when a marker from the graphical region is selected, one text region can reveal metadata associated with that marker, such as global metadata (title, abstract, etc.) for the source document and local metadata specific to the associated NUT (for example, the snippet of text from the source document containing the language from which the NUT was extracted, properly highlighted). The information flow can also move in the other direction. For example, if a document from the scored list in the text region is interactively selected, its graphical marker(s) can be highlighted.

If a user finds a plotted data-point to be inappropriate for their desired search criterion, preferably the user can interactively delete it. Alternatively, the user can interactively enhance the relative value of a selected point. In either case, the user's action can be used, in a negative or positive way, to refine the search (and later searches) via feedback, as discussed below.

The graphical region can also include textual information which describes regions of the graph by using clustering algorithms. For example, certain graphical features, like a peak in a histogram, can be tagged with common words from documents within that peak, or by previously known features from external databases.

In another example, the plot containing points relevant to the search may be marked up in ways to provide meaning to the revealed patterns. For example, if a histogram of points is returned with a few peaks, dividing lines may be shown that separate the peaks. These lines can be generated from curve-fitting (as described below) or can be drawn by the user. Furthermore, for each distinct region common keywords can be shown which distinguish each peak from the others. In one embodiment, the term vector associated with the entire document set can be shown in one text region, while in each distinct, clustered sub-region, distinguishing keywords unique to that subset can be displayed.

Example

One particular embodiment for a web-based interface is depicted in FIG. 3. The query user interface 305 shown allows a user to input the desired keywords, both globally and locally describing the context of the quantity, as well as to enter numeric constraints.

In the top search line the user enters into input module 305 the range of the quantity desired ('0.1 to 20 microns') occurring near a local keyword (wavelength). The second quantity option could reveal a second search line. A field for global keyword ('laser') can be labeled to indicate the global nature of the keyword. The input lines may be written in a variety of number and unit formats because the same algorithm is used to convert the input as is used to create the index.

Query module 210 processes the search parameters and identifies potentially relevant NUTs 220, while scoring module 225 ranks the relevancy of all such candidate NUTs 240 (see FIG. 2). The graphical interface 250, 300 plots the value of the frequency of each NUT 240 determined to be relevant by the scoring module 225 on the vertical axis 320 and the date of its source document on the horizontal axis. Multiple markers (or 'hits') may be returned for each document. Above the plot are options for choosing a histogram display, scatter plot, or reversing the axes. The user may select a region on the plot to adjust the axes' limits. The axis labels and scale use the user's input units (Hz), and all quantities in the documents matching the search criterion are converted to these units for the purpose of display.

For a user-selected point, the metadata corresponding to that document is shown in the text region on the right, including document title, date, authors and abstract. In addition, the user can click on this metadata to link to the original full-text source document. The snippets containing the expressed quantity and keywords are also shown in this panel. Upon clicking the document link, the document will be retrieved, either in its original form or with intelligent units conversion such that all relevant information in the document can be converted to the unit(s) of choice.

After the user configures the output, the display can be converted or integrated into a finished report.

III. Scoring

Figure 4:
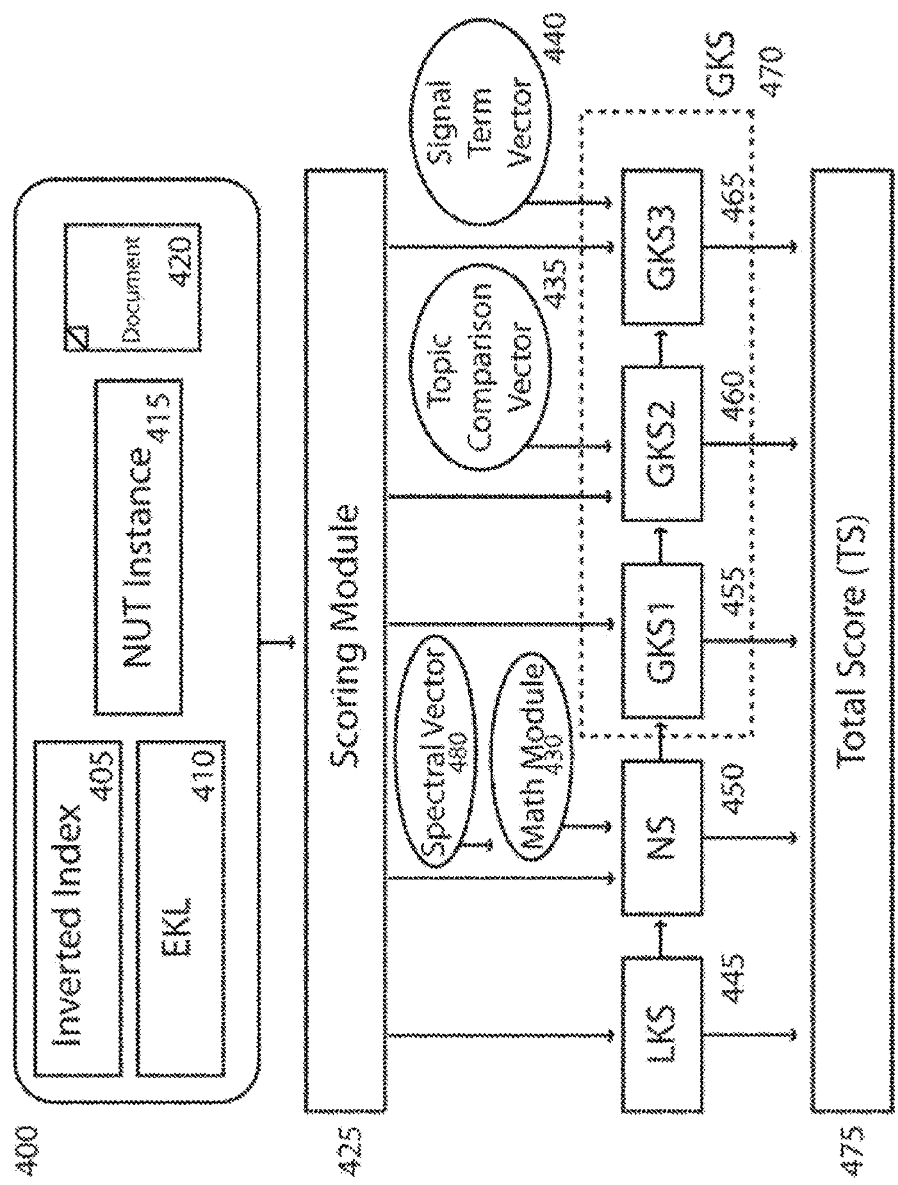
FIG. 4: A schematic depicting the components participating in and order of operations used for scoring in accordance with one embodiment of the present invention.

FIG. 4 diagrams an exemplary scoring module 425 for determining the relevancy of a NUT instance 415 to the query. Scoring is preferably determined on a data-point by data-point basis, by evaluating how well the NUT matches the numeric constraints of the query and the contextual constraints of the query (e.g. local and/or global keywords). In one embodiment, three metrics are combined into a total score (TS) 475 to determine the goodness-of-fit of a NUT: the local keyword score (LKS) 445, the numeric score (NS) 450 and the global keyword score (GKS) 470. These three individual sub-scores can be weighted differently in the total score 475, depending on the application. In one embodiment, the sub-scores are evaluated in the order of LKS 445, NS 450, GKS 470, and scoring module 425 can truncate the scoring process in the interests of efficiency and discard a particular NUT if any sub-score for that NUT falls below a threshold value, without evaluating the remaining sub-scores. This scoring system is not limited to evaluating the relevancy to the query of each document as a whole, as is often the case for standard keyword search algorithms. Instead, since each data-point is individually plotted, the relevancy of each NUT instance 415 is preferably evaluated. A single source document 420 can have multiple data-points extracted and scored. The threshold levels that determine which points are displayed (for either the total score or the sub-scores) may be pre-set, adaptively determined based on the initial results, or set by the user via the query interface. The user may also choose to display a certain number of high scoring results without concern for the absolute scores.

Local Keyword Scoring

In a preferred embodiment, LKS 445 is evaluated for each NUT instance 415 matching the unit-of-measure specified in the input query without regard to its numeric value. Only NUTs matching the unit-of-measure specified in the query (either in the exact form or in a scientifically or semantically matching form) as determined by query module 210 are considered as possible matches. Scientifically equivalent units include, for example, NUTs with unit "seconds" even if the query specified the unit as "days." Semantically similar units include examples such "car" and "automobile." In some embodiments, partial/relative similarity of non-scientific units may be quantified and reflected in the score.

In one embodiment, the relevancy of the input local keyword to each NUT satisfying the unit-of-measure match is determined by scoring module 425 through several processes. First, if a context tag has been stored for NUT instance 415, scoring module 425 checks to see if the context tag associated with NUT 415 matches the input local keyword. If the local keyword matches this pre-processed contextual information exactly or indirectly as a synonym, then NUT 415 is given a high sub-score as LKS 445 without having to reprocess other local information from the source document, and scoring module 425 may move on to determining the other sub-scores. If scoring module 425 determines there is no match or that the match is too ambiguous, then LKS 445 is determined by scoring module 425 based on the match between the input local keyword and words occurring in close proximity to NUT 415 in source document 420 for that NUT, as further described below. Standard keyword search techniques such as stemming, spelling alternatives, synonym search, exact phrase, and parts of speech identifiers can be employed by scoring module 425 to assess matches with the input local keyword(s); in addition, field-specific synonyms can be compiled which reflect terms used interchangeably in a specific industry or specialty. To the extent not adequately provided in standard natural language processing packages, such semantic rules can preferably be added to expert knowledge library 410, as described below.

Since the positional information of each keyword, including NUTs, is stored in the inverted index 405, scoring module 425 can determine the positional separation between NUT 415 and the local keyword. Goodness-of-fit is determined in scoring module 425 in part by considering the separation span between the local keyword and the NUT. For example, if a NUT is in term position 23 in the document and the queried local keyword is found in position 28, then the term separation span is 5. Calculating the separation between a keyword term and a NUT can be implemented as a variation of a conventional span query involving the separation between two keyword terms.

Any punctuation separating the keyword from the NUT can also be considered by scoring module 425 in the determination of LKS 445. For example, a period marking the end of a sentence found between the local keyword and the NUT preferably reduces the score further. In addition, certain intermediate words such as "and" and other prepositional phrases can be used to either overweight or underweight the score. In the context of NUTs and determining numeric contextualization, a small set of such rules can provide an effective approximation of full natural language processing.

One possible weighting method to be used by scoring module 425 for determining LKS 445 of NUT instance 415 based on locally proximate words in source document 420 is now described:

1. Each word occurring within source document 420 in close proximity to NUT 415 (i.e., within a short span) that semantically matches the local keyword entered via input module 200 is assigned a value of 1. The maximum span qualifying for these purposes can be chosen by individual practitioners, but preferably is not greater than 10.

2. The value of each word near the NUT is then scaled by a factor $\delta$ to reflect degree of similarity with the local input keyword. The value of $\delta$ can be determined by using standard keyword similarity techniques as well as integration with technically related terms stored in expert knowledge library 410. $\delta$ is also preferably scaled by a similarity score $\delta_u$, determined by scoring module 425, to reflect the relative quality of a partial match/similarity between NUT 415 and the unit-of-measure specified in the query; for standardized scientific units, $\delta_u$ is preferably 1.

3. If a period, comma or semicolon separates the keyword from the NUT, scoring module 425 reduces the score by a scaling constant $\beta_n<1$ where each n denotes a scoring for a different punctuation. If punctuation information is not stored in the index then all $\beta_n=1$.

4. Certain regular expressions, for example "the (keyword) of (keyword) is (quantity)" separating the NUT from the matched word(s) can lead to a score increase or decrease of $\gamma_j$ where j denotes a specific phrase, and different $\gamma_j$ can have different values.

A local keyword's relevancy to the NUT is determined as a combination of the scoring factors detailed above. For example, one possible function for determining the contribution to the LKS 445 sub-score of a word in source document 420 located proximate to NUT 415, for a NUT with a unit scientifically related to the unit specified in input module 200, is:

$$LKS=\delta*\beta*\Pi_j\gamma_j/(\text{span})$$

where $\Pi$ denotes a product of all $\gamma_j$ terms.

LKS 445 is evaluated for all words in source document 420 meeting the above constraints. In a preferred embodiment, if the word with the single highest LKS has an LKS greater than a predetermined threshold value, for example, 0.2, then the NUT can be further evaluated as a potential hit to the query parameters. Alternatively, the sum of all the LKS for all qualifying words can be combined to determine qualification of the NUT for further evaluation. If a NUT fails to meet these qualifications, the NUT is considered not to be a hit and its NS 450 and GKS 470 need not be evaluated. Some of these NUTs rejected at this stage may be reconsidered as matching the query parameters if they become introduced again using feedback as described below. By having scoring module 425 first evaluate LKS 445 and discard many potential NUTs based on that sub-score, the number of potential NUTS to be further evaluated is preferably reduced, with a corresponding reduction in computational effort.

Number Scoring (NS)

In a preferred embodiment, for each numeric query, scoring module 425 utilizes absolute scoring methods, which reflect how well the value of a NUT matches the numeric query terms, as well as relative scoring methods which take into account how well a NUT numerically matches other NUTs. "Closeness" of match between a given NUT and the numeric value specified in a query via input module 200 is meaningfully measured in the context of a broader distribution of such values. This relative evaluation can consider the distribution of only those NUTs that have a sufficiently high LKS 445, or alternatively can consider the full numeric distribution of NUTs in the corpus that possess the correct unit specified by the user query via input module 200 as determined by query module 210. Preferably, both absolute and relative scoring methods are factored into NS 450.

For queries specifying an individual numeric value, any NUT with a matching value is returned, provided it was approved by the query module 210 and with sufficient LKS 445, where matching can be defined as to be consistent within an applicable level of precision. The level of precision can be chosen by the user using graphical interface 300 or can be automated. An automated precision can be at a fixed level or can be determined as a fixed percentage of the numeric distribution of NUTs in the corpus with sufficient LKS. For example, in the context of a search for 23 m, if the full numeric span of NUTs with sufficient LKS ranges in magnitude from 1 m to 100 m, query module 210 could pass NUTs along to scoring module 425 for evaluation which deviate from the specified 23 m by 1 m, representing a 1% error in terms of the full range of NUTs initially approved by query module 210. In the graphical interface, this percentage could be selected by the user to be large or small in order to relax or tighten numeric constraints when searching for a specific number. Alternatively, this percentage could be programmed into query module 210 as a fixed percentage of the full range. Any numeric match of the NUT to within this error is preferably assigned an NS score of 1 by scoring module 425.

For a numeric range query, the numeric value of each NUT (approved by the query module and with sufficient LKS) will lie within the given range. In one embodiment, scoring module 425 assigns a NUT whose value falls in the middle of a user-selected numeric range a higher NS than NUTs with values near the extremes of the designated range. Alternatively, any NUT whose numeric value falls within the specified range can be assigned a full NS score (e.g. NS=1).

Figure 5:
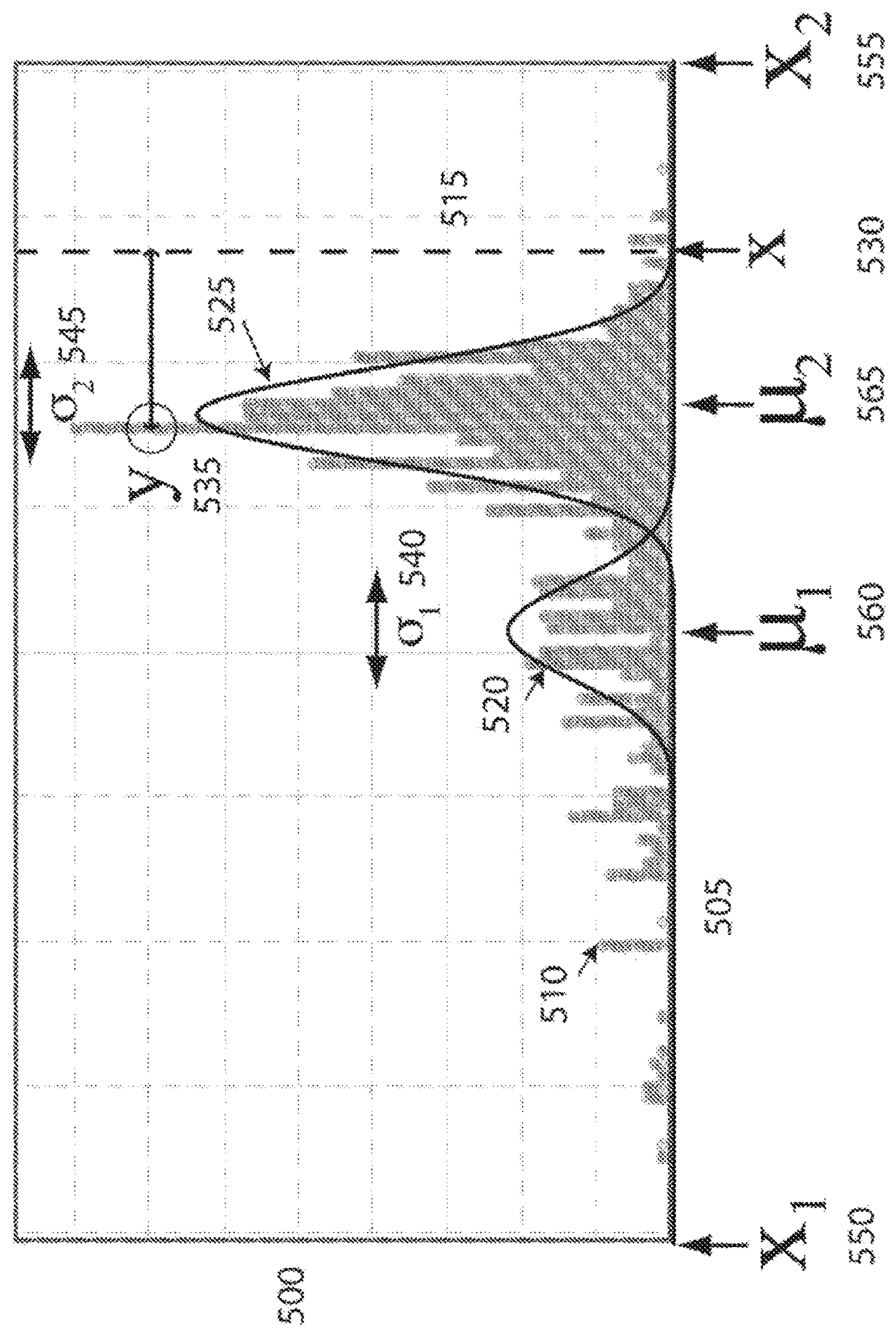
FIG. 5: An example data set, which is curve fit to determine the mean and widths of spectral features in accordance with one embodiment of the present invention.

In order to provide relative NS scoring for each NUT, the distribution of numeric values across the full span of NUTs with sufficient LKS (or alternatively, only the distribution for NUTs within a small range of the numeric query parameters) is preferably utilized. These data-point distributions can be stored as a vector (the "spectral vector" 480), with each binned number and its frequency of occurrence defining the two columns of the vector. Math module 430 analyzes the data contained in the spectral vector 480 using standard curve fitting techniques (as depicted in FIG. 5) to identify local features in the distribution, such as the mean locations of local maxima and minima; it also identifies assumed center values $\mu$ 560, 565 for each such local feature, and the corresponding widths $\sigma$ 540, 545 of those local features. This non-linear functional fit 520, 525 with multiple peaks centered on individual $\mu$ and having distinct $\sigma$, is binned and stored. The numeric binning used in the construction of the spectral vector 480 from the spectral signature can be chosen by the user in the interface or can be automatically determined based on the range.

After math module 430 determines this spectral vector 480, scoring module 425 preferably uses this information to assist in calculating the NS 450 for a NUT 415 with sufficient LKS. For example, the NS of an individual datapoint can be determined based on factors including its separation from the $\mu$ of the closest feature to the numeric parameters entered into input module 200 as well as the $\sigma$ of this closest feature.

Consider an example search for a single numeric quantity. Assuming that the user does not intend the search to be limited to retrieving only those results that exactly match the numeric query term, the local range of acceptable results near the numeric quantity should be determined. The value of $\sigma$ can provide a relevant scale by which to measure "nearness" and limit the search. For example, if a query is made for 'X kg', the NS of a NUT with the numeric value of 'Y kg' can be determined by considering both the difference (X−Y) as well as the a of the feature in the spectral signature closest to X. Scoring module 425 can potentially utilize and weight the parameters extracted from the spectral signature in a many different ways to determine NS 450. For example, one possible scoring method for determining NS 450 is:

$$NS=\sigma^2/((X-Y)^2+\sigma^2).$$

In accordance with the above formula, it will be apparent that the larger the width $\sigma$ of the relevant local feature, the less relatively significant is a given absolute distance X−Y from the number specified in the query.

User-interface options in graphical interface 300 preferably include the ability to constrain results, such as to those deviating from a distribution mean by an arbitrary distance, for example, by $2\sigma$. Alternatively, if the intention of the search is to locate outliers, results that deviate significantly from $\mu$ of a given feature but are still within the search constraints can be over-weighted.

For example, FIG. 5 shows sample results retrieved from a query processed by query module 210. In this example, peaked features emerge in the distribution with given widths. In addition to the main peak 525 with $\mu=\mu_2$, a satellite peak 520 on the left of the distribution is seen which can either be viewed as the tail of the main peak or alternatively its own small feature. Here, scoring module 425 would preferably take into account the difference between the numeric query parameter X 530 specified via input module 200 and the value of NUT instance 535 (Y), as well as the width of the feature centered on $\mu_2$. For a distribution with large $\sigma$, a large difference between X and Y might still allow Y to be considered a good match to the user specified X.

In another example, consider a numeric range query rather than a single-value query. If the user enters a range query e.g. "$X_1$ to $X_2$ kg", one embodiment could modify the results by amplifying initial results within the range which appear in clusters. For two observed peaks within the input range, as characterized for example in FIG. 5 by ($\mu_1$, $\sigma_1$) and ($\mu_2$, $\sigma_2$), the system could then choose to weight a result Y with:

$$NS=\sigma_1^2/((\mu_1-Y)^2+\sigma_1^2)+\sigma_2^2/((\mu_2-Y)^2+\sigma_2^2).$$

Alternatively an expression that weights the height of the peaks can be used. The above expression is thus one of many possibilities that the system could recognize to give importance to clusters as a way to aid pattern recognition, in the same way that humans look to recognize correlations despite the presence of some data that disobeys the dominant pattern.

The above methods demonstrate some of the many ways in which the initial numeric distribution can provide further information to improve the numeric search results. Selecting different modes of search will change the appropriate algorithm. For example, in certain knowledge exploration tasks, outliers should be retained rather than removed.

Global Keyword Scoring

The global keyword specified in a query via input module 200 is preferably used to determine the relevancy to the query of the entire source document 420 wherein NUT instance 415 is found; whereas LKS 445 and NS 450 reflect the individual relevancy of NUT 415 to the query parameters. This step ensures that if a NUT is selected for presentation, the source document from which it was extracted is contextually relevant to the intentions of the query. Preferably, the global keyword is therefore not considered merely a word to match in the document containing the relevant NUT but is rather assumed to be indicative of the broad topic of interest to the user. Therefore, the global keyword (or even a similar word) need not appear in a source document in order for that document to be relevant to the search. For example, if the global keyword "medicine" is entered via input module 200, the source document for a NUT with a high NS 450 and LKS 445 discussing a specific medical treatment would likely be a highly relevant hit regardless of whether it explicitly mentions the word "medicine." Creation of medical ontologies stored in expert knowledge library 410 as described below, or alternatively a latent semantic analysis (also described below), can be called upon by scoring module 425 to recognize that the source document is medical in nature.

Scoring module 425 preferably calculates three GKS scores: GKS1 455, GKS2 460, and GKS3 465, with increasing levels of filtering; some embodiments may not calculate all of these three GKS scores.

The lowest level of determining contextualization is searching for the actual global keywords. Standard keyword based techniques well known to experts in the field of information retrieval are first used by query module 210 to locate the global keyword or a semantically matching term within source document 420. Scoring the relevancy to the global keyword of a word suggested by query module 210 can be performed by scoring module 425 by leveraging term frequency-inverse document frequency (tf-idf) techniques well known in the field. These techniques include taking into account the global keyword term frequency within that document, how often the word shows up within the larger corpus of indexed documents (document frequency), and the length of the source document. The proximity of the global keyword to the NUT is not necessarily significant in determining the GKS; however the position of the global keyword (or matching term) in the document is significant in assigning scoring. For example, a global keyword appearing early in a document would be given a higher GKS score by the scoring module 425 than one appearing later. In addition, appearance of the global keyword in the abstract or metadata of the article also increases the GKS 470. This preliminary determination of GKS is denoted herein as GKS1; thus, GKS1 is an early loose filter. In some embodiments GKS1 can be the first sub-score calculated by scoring module 425, before LKS 445 or NS 450 and can be used as a preliminary filter.

After the relatively low-level GKS1 scoring described above, scoring module 425 next determines the context and topic intended by the global keyword specified in the query. Expert knowledge library 410 is preferably used to construct a topic comparison vector 435, comprising terms expected to be relevant to the ontology related to the global keyword. This topic comparison vector 435 can alternatively be constructed by well known natural language processing and artificial intelligence techniques whereby the global keyword has been previously related to a list of terms based on learned information from a large training data set. This knowledge can thus be machine learned or hard coded by experts in the field. The overlap of the topic comparison vector 435 with the term frequency vector from the original source document containing each NUT that is being evaluated is used to determine a second score GKS2. Scoring module 425 can continue to determine the relevancy of a given NUT by considering NUTs with relatively low GKS1 and GKS2 scores thereby using these scores only as a weak filter of the NUTs with high LKS and NS. This leads to significantly increased recall which can be tolerated because the subsequent GKS3 filtering stage will be relied on to improve precision. Thus, the required performance of the NLP techniques for efficiently determining the topic comparison vector 435 in this system are drastically reduced in comparison with a system where the NLP categorization stage forms the core method of filtering results. In this embodiment, it simply represents a first pass filter when can be left intentionally loose.

To generate GKS3, the final global keyword contextual score, the spectral vector 480 is again considered. The distribution used to determine the spectral vector 480 can be taken from the full corpus of documents containing NUTs approved by query module 210, or alternatively only from those NUTs with LKS (and, optionally, NS 450 and GKS1 and GKS2) sub-scores above a sufficient threshold. The spectral vector is then analyzed by math module 430 to determine the local spectral features of the distribution of NUTs as described previously.

The subset of NUTs chosen to be included in the subsequent analysis can be automatically determined from the spectral signature or based on criteria selected by the user through the graphical interface. For example, the NUTs within 1σ of the μ of the closest feature to the numeric parameters specified in the query via input module 200 can be chosen for analysis. The term frequency vectors corresponding to the source documents for the selected NUTs are next analyzed, where each term vector contains a full list of the words and NUTs in that document. For example, if there are 10 NUTs with numeric values within a fixed width around μ of the feature closest to the numeric search parameters, then the term vector for each source document containing one of these NUTs is retrieved. We refer to these term vectors herein as the signal term vectors 440. Note that there may be fewer than 10 unique signal term vectors 440 analyzed in the example noted, due to the possibility that more than one of the 10 relevant NUTs might have been extracted from the same source document.

Other document term vectors, either all those remaining in the corpus not chosen as signal term vectors or simply a random sample selected far from the feature of interest, are preferably analyzed to determine the most common shared background terms. These terms, which by design are not unique to the signal term vectors 440, are then subtracted from the signal term vectors. The remaining terms in the signal term vectors are compared, and the most common signal terms are then extracted. These remaining terms are indicative of the unique similarities of the contextually relevant documents. These approaches assume that most of the NUTs with high LKS and NS sub-scores are extracted from source documents that properly represent the desired context, which is believed to be a valid assumption for large databases and efficient LKS and NS scoring.

These common shared terms from the signal term vectors 440 are then used to update the ontology relevant to the queried context and form a modified ontology term vector. Each NUT that had a sufficient LKS and NS is now evaluated in terms of the overlap between its term vector and the modified ontology term vector relevant to the global keyword in the query. This overlap determines a final GKS3, which can be combined with GKS1 and GKS2 by scoring module 425 to return a final GKS 470.

Total Score

A TS 475 for each NUT instance 415 is then assigned based on a combination of LKS, NS and GKS. The preferred functional combination could be a (weighted) sum or product of the three scores depending on the application and the extent to which the weighting of a single score is intended to be influential. Any NUTs which have a TS greater than either a user-defined value or a preselected threshold are plotted in an output display by graphical interface 300, as described in the graphical interface section above.

In one embodiment, scoring module 425 can calculate scores in the absence of a user-specified global keyword, using only LKS 445 and NS 450.

If a local keyword is not specified in input module 200, then scoring module 425 can compute TS 475 based only on NS 450 and GKS 470. If the number range is not specified, then TS 475 depends only on LKS 445 and GKS 470.

In the absence of a user-defined global keyword to specify document contexts, an appropriate global keyword and clustering information about the NUTs found within each spectral feature can be automatically determined. This embodiment enables the user to learn the context of various clusters in a chosen distribution of NUTs. For example, if a user were interested in applications of lasers of various powers, the user could user "laser" as a local keyword and specify "Watts" as the unit requested across a large numeric range. Scoring module 425 would then identify the clusters through the curve fitting process performed by math module 430 and can inform the user of the contextual categories of laser usage for different applications.

Queries with missing components such as missing local or global keywords, or numeric constraints, as well as queries with large specified numeric ranges or keywords which are not highly restricting can provide for exploratory search. Graphical visualization of results as well as clustering analysis as described below can provide efficient iterative search whereby the user begins with little knowledge of exact search parameters but refines his search based on early results.

Scoring with Expert Heuristics

Heuristics and ontologies stored in expert knowledge library 235 can be utilized both in the development of NUT context tags and in the scoring process, as described above. When used in the scoring process, a scaling factor can be applied to any of LKS, NS or GKS depending on the degree of adherence of the NUT to these rules. Violation or adherence to these rules will affect the overall scoring of the NUT and each rule can be individually weighted by experts who determine the importance of each constraint. This scaling factor can also include factors determined prior to the search during index construction that reflect the confidence that a NUT is a priori related to a given context. These factors can be stored in the index for later incorporation into the TS.

Alternatively or in addition, this knowledge can influence the numeric ranges used for curve fitting of the NUT distributions, and can also be used to influence the curve fitting function in math module 230 by more heavily weighing NUTs that are consistent with these higher level heuristics. In addition, expert heuristics and ontologies can impose known a and u for specific query parameters which can be compared with the spectral signature. This approach, while potentially calculation and time intensive, can provide improvements in contextualization accuracy.

IV. Clustering and Similarity Analysis

After the query results are returned according to some or all of the algorithms used by scoring module 225 as described above, the results can be used to provide further information about the retrieved information and can alternatively be used to refine the search.

For all NUTs returned in the final query results, the term frequency vectors can be constructed for their source documents. These vectors include all keywords and the NUTs extracted from the document, and where NUTs with like units can be binned together with a numeric binning either chosen by the user in the interface or determined automatically. The term vectors from all documents that contain a NUT retrieved by the query module 210, or alternatively, a NUT with sufficient LKS, NS, GKS or TS; or the NUTs in a given cluster, can be used for a next iteration of scoring similar documents in the corpus that were not retrieved. For example, the term vectors of documents containing retrieved NUTs whose values fall near the $\mu$ of a given feature, for example to within $1\sigma$, can be compared to extract the terms most common to all documents plotted in the feature. This gives the user information about the common properties of the documents in that cluster. These may be common properties that were not reflected in the query or known to the author of the query.

The region used to define a cluster, in which the term frequency vectors are compared, can be graphically recognized through the spectral features in the retrieved hits distribution. With this method these contextual clusters are defined automatically, as described in previous sections. Alternatively, users can click on a range where a feature is evident or can manually fit to a range to extract a local peak (i.e. a Gaussian fit) which is used to define the cluster. This term vector comparison gives information about similarity features which define that cluster. Thus, graphical features as well as term vector comparisons can be used in tandem to define clusters. The cluster chosen for further exploratory analysis by the user need not be the central or primary cluster in the data range. The user can choose to zoom-in, and effectively amplify less distinct features within the dataset through the graphical interface.

Term vector similarities can be used to extract NUTs with numeric values outside of the range specified by the query parameters with either similar or orthogonal term vector properties. For similar document extraction, documents which have similar term vectors to those of the NUTs determined to be within the cluster can be returned. For orthogonal information, a set of documents corresponding to the retrieved NUTs can be compared by looking at the similarity of their term vectors after subtracting out the common similarities that they share with term vectors from documents found in the entire corpus and not included in the query retrievals. This would indicate in what way the document containing the NUTS with high scoring are in fact different from the remainder of the corpus or some subset of the corpus.

If it is determined that two (or more) semantically distinct clusters occupy roughly the same volume in numeric space, then the interface may allow the clusters to be split from each other (for example, into separate histograms).

In addition, with calculated distributions, one can classify the expected keyword term vectors for hypothetical documents containing NUTs at a specific numeric value even if such a document with such a NUT does not exist in the corpus. For example, using this process one could determine the context of hypothetical document with a given number of NUTs.

Our numeric approach can also determine the similarity of searches, by determining the spectral signatures of different searches. This includes the similarity between both searches for contextualized units without regard to numeric value as well as the similarity between searches including numeric ranges. This similarity search metric can indicate the similarity between applications or technologies. The similarity between searches is evaluated by math module 230 by calculating the overlap integral between the best fit functions to the entire distributions of hits in multiple searches or between specific local features within a given numeric range.

Latent Semantic Analysis

Latent semantic analysis (LSA) is a natural language processing technique for analyzing relationships between a set of documents and the terms they contain by producing a set of concepts related to the documents and terms. Details of the technique as applied to traditional keyword indexing are familiar to practitioners of skill in the relevant arts, and are presented for example in *Indexing by Latent Semantic Analysis*, S. Deerwester, Susan Dumais, G. W. Furnas, T. K. Landauer, R. Harshman, in Journal of the American Society for Information Science 41 (6): 391-407 (1990). LSA can reduce the large variable subspace of keywords to a much smaller matrix by retaining only the highest eigenvalue solutions in the singular value decomposition process. For our present purposes, the numeric index described here can improve the efficiency of this process by binning multiple number unit pairs together because the relationship between two NUTs with the same unit, but different numeric value, is intrinsically known. Thus, each NUT is not required to be an independent variable in the initial matrix. Binning can be performed at arbitrary spacing or can more intelligently leverage previously known correlations between NUTs based either on the spectral signature of the corpus for a given unit. For example, LSA can be done on a reduced matrix corresponding to only documents within 1σ of the spectral feature most relevant to the query. Alternatively the data range for implementing LSA can be based on hard coded ontologies in the expert knowledge library for a given application and technology.

LSA can be used with a matrix combining keyword and binned numeric tokens to determine numeric to keyword relationships. For example, the word 'infrared' can be learned to be associated with a certain wavelength range, 'blue' with another wavelength range, and 'ultraviolet' with another. In this example, the system can automatically associate semantic keyword concepts and numeric entities (whether a single value or a range of values) without being preprogrammed with the appropriate labeling. Furthermore, differences between community defined numeric ranges for a given keyword as reflected in input search parameters and those prescribed by standardized definitions can be determined.

Certain number unit pairs may be optimally categorized as individual tokens, and not binned with any other pairs or alternatively with very few other numeric values, thus forming an effective delta function feature with fixed mean but very narrow width. For example, fundamental constants such as the 'speed of light' (~3e8 m/s) will behave in this manner. NUTs such as these determined for a given application will act as effective keywords; however for most applications these extremely narrow distributions are the exception, and thus significant matrix reduction is expected for realistic data sets.

V. Feedback

Query module 210 also can incorporate pseudo-feedback to forward new NUTs to scoring module 225 or directly to graphical interface 250 based on the distribution of the initial retrieved NUTs. For example, the term vectors corresponding to selected documents containing NUTs with high TS whose numeric values fall within 1σ of the mean of a spectral feature of interest can be compared. Additional documents in the corpus which had not been initially returned but which share the same highest frequency terms in their term frequency vectors with those selected documents can now be retrieved via an additional search and added to the search results. In addition, outlier data-points 510 which also have minimal overlap with the term vector of the documents containing NUTs centered on the mean of the feature can be removed. This feedback stage 255 to either increase the retrieved hits or filter the hits can be done automatically as a single stage, hidden from the user's perspective. Alternatively the user can be shown the initial hits and can then interactively request feedback processing. This process facilitates efficient exploratory search as described above.

This quantitative process can also be used to evaluate the quality of the data in the corpus by comparing distribution widths in the dataset to known distributions. These known distributions can be provided by hard coded expert knowledge stored in expert knowledge library 230.

VI. Operation on Networked Computer Systems

Figure 6:
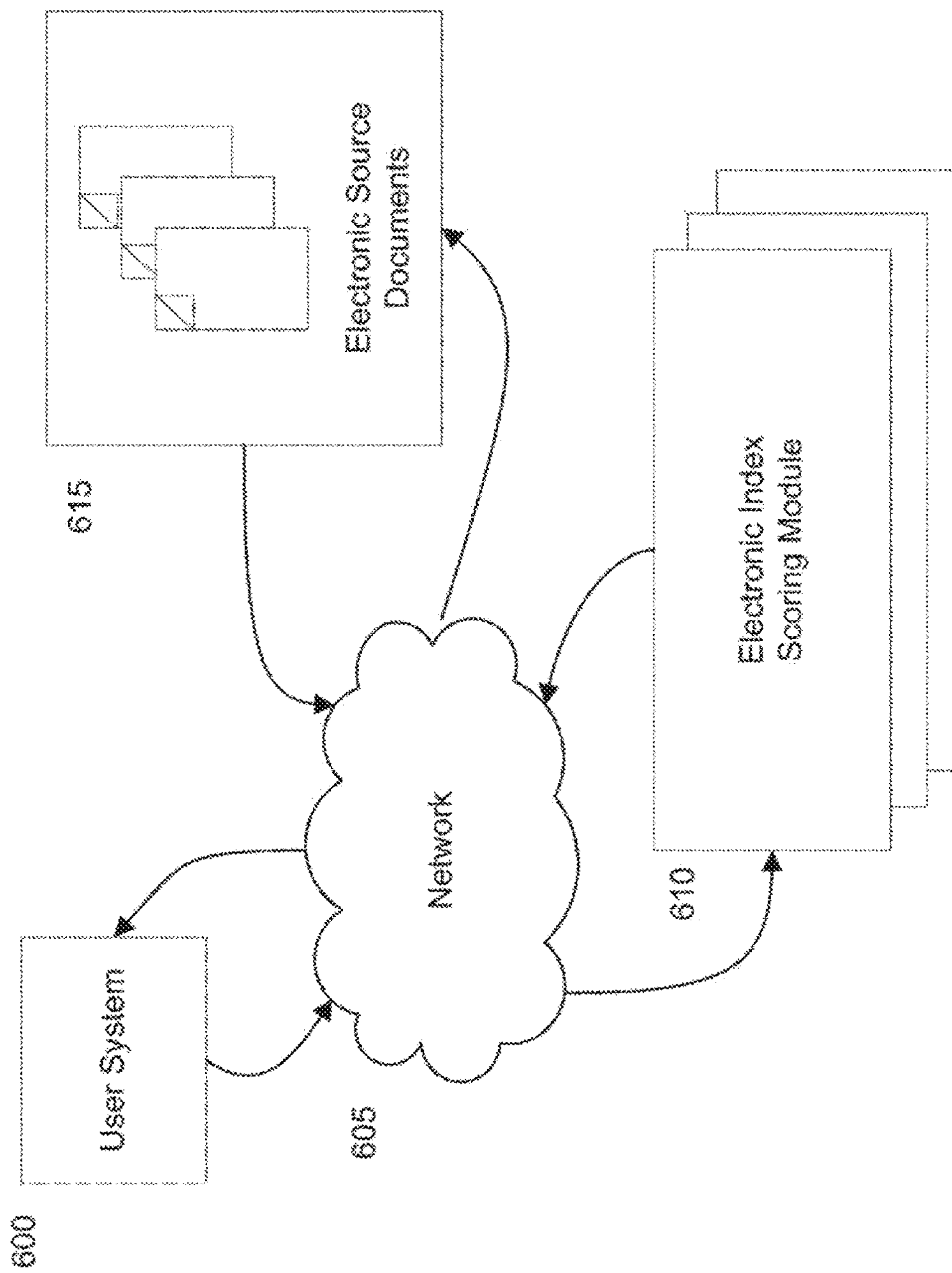
FIG. 6: A schematic depicting an embodiment of the present invention involving several computing systems.

FIG. 6 diagrams an exemplary arrangement of the present invention using multiple computing systems communicating via network. The computer-searchable electronic index (e.g. inverted index 125 shown in FIG. 1) is generated and stored in computing system 610 by indexer software (e.g. indexer 110 shown in FIG. 1) that extracts numeric data items from a set of source documents (e.g. document(s) 100 and external databases 105 shown in FIG. 1) hosted on other systems 615 and accessed via network 605. As practitioners will recognize, computer system 610 may in turn comprise a plurality of server computers in mutual communication. User system 600 displays the query user interface (e.g. under control of Input Module 200 shown in FIG. 2) and receives the desired keywords and numeric constraints. The query is transmitted via a network 605 to computing system 610, which hosts the index as well as query processing software and scoring software (e.g. query module 210 and scoring module 225 as shown and described in connection with FIG. 2). Using the query processing and scoring software, computing system 610 processes the query and retrieves and evaluates the relevant NUTs from the index, based on appropriate query relevancy, including contextualization. Results from the query are transmitted via network 605 back to user system 600, where preferably they are graphically represented to the user. Generation and display of interactive graphical output (e.g. by output converter 245 and graphical interface 250 shown in FIG. 2) can preferably be performed by server software modules executed on computing system 610 along with supporting client applications on user system 600, as practitioners will appreciate. Preferably, this interface enables a user to provide feedback to the search results, as described above, via inputs on user system 600 transmitted back to computer system 610 over the network 605.

VII. Knowledge Creation

During the indexing stage further tokens can be added to the index entry of a document by intelligent analysis of multiple NUT instances.

For example, the information retrieval and contextualization system provides the ability to extract correlations between independent data and represent this information as new tokens. For example, a NUT indexed as '$600,000' and another stored as '1500 $ft^2$' can be combined to create a new unit '400 $/$ft^2$' if the two units are determined to be semantically related in this way. Subsequently, the new unit can be automatically plotted by year or by country, representing information which may not exist in that form in any document.

This unit creation process is complementary to redundancy cross-checking of extracted NUTs. For example, a length span (in meters) and a duration (in seconds) have been combined in a text to create a nearby third quantity representing speed (in meters/second). Because this information is redundant, two quantities can be used to cross-check the proper extraction of the third.

At the query stage, combination units can be generated at the request of the user, for example, if the user searches for compound units. Input converter 205 can evaluate the compound unit determining the underlying units. These underlying units form the basis of a new query performed by query module 210. Scoring module 225 evaluates each individual NUT suggested by query module 210 for eventual combination by evaluating the LKS and GKS, as well as the numeric value of the combined NUT. The numeric value of each individual NUT is not considered in scoring. Based on these scores, scoring module 225 can then evaluate whether it is appropriate to combine both units to create the new unit, and whether that new unit is contextually relevant following the methods of scoring module 225 described above. Alternatively, combined units generated from previous searches of two NUTs can be automatically stored through a feedback process 270 when two units are plotted against each other as described above.

VIII. Additional Applications

Non-Scientific Units

The approach described herein is not limited to scientific applications, since a number-unit pair can include scientific units such as square feet as well as linguistic units such as barrels of oil or Yen. Similarly, numerical values can also include terms such as dates, barcodes, SKU numbers, etc.

Export to Alternative Structured Formats

In another embodiment of this invention, information can be exported from the inverted index 125 into other reusable data-types and storage architectures. For example, the analysis modules described here can convert the index 125 into an XML (or RDF, or similar) format. This new semantically-tagged document could then be read quickly and meaningfully by systems using XML, because the computationally intensive translation has been performed in advance. Furthermore, a relational database architecture can be populated with quantitative content from the index 125, which can then be accessed using typical query languages (such as SQL or SPARQL).

The techniques described during index creation performed by the indexer 110 could also be used to error-correct the extraction process by cross-checking the initially extracted value with the extracted distribution of similar found quantities as well as expert-rules and conditions.

Import from Alternative Structured Formats

Documents are increasingly semantically marked up in XML or related formats without the techniques described here. Although the parsing methods described here are then irrelevant, the claims made here regarding the graphical interface for exploratory search remain relevant and useful. In this case, instead of extracting local information from the single document, the algorithms described here could also leverage the network of linked data semantically connected to the triple containing the numeric value returned by the search. While the quantity would still be linked to a single source, the clustering and scoring methods would be able to then draw on a larger source of pre-linked information.

Leveraging the Machine-Learned Ontology

In addition to manually entered heuristics and ontologies, the expert knowledge library 235 described in this invention updates its stored knowledge via a feedback mechanism 265 using rules for machine learning over a large document corpus 140. In this learning process, the system will, for example, adapt techniques from latent semantic analysis to analyzing numeric quantities. This library, and the ontologies contained within, can be further leveraged in other applications besides the search application mentioned here. This library may be exported to other expert systems as well as learn from other expert systems to improve its own performance. Particular programming interfaces may be used to facilitate this sharing of learned expert level knowledge.

The system may also learn from user interaction (and implicit feedback) in ways that are stored in the library for repeated later use. Such 'search wiki' concepts are becoming commonplace in standard keyword-based search engines and can also be leveraged here, albeit with a different user interface.

Reports and Feeds

Alternate outputs from this invention can be designed to produce streamlined and automated reports for particular numeric queries. These reports could include continuously updated summaries of technology specifications. Similarly, other feeds and alerting systems can be installed which notify a user when certain numeric results which satisfy a standing query parameter set appear in the literature. For example, the system could generate a feed of all the latest documents mentioning a laser with a wavelength in a certain range and a power above a certain number.

eCommerce Applications

This invention can also be advantageously used for ecommerce applications. For example, aspects of the invention can be employed to generate a product index that is searchable, e.g. by price and performance specifications, as well as with contextual constraints such as keywords, based on a corpus of original documents providing non-structured and semi-structured product descriptions. A user may then, for example, enter a search for a digital camera, with a specified range of Megapixels. This search could include well defined numerical ranges for performance specifications and prices, or alternatively could comprise loose constraints for exploratory search. Further aspects of the invention can be employed in scoring the most relevant matches, and in the interactive presentation of matching product data to the user. For example, the clustering and similarity analysis techniques described above can be employed to provide a user with further insight into categories of available products, help visualize the distribution of price and performance across products, and highlight characteristic features among groups of products, which may help to distinguish products of interest and to spur further exploratory search.

What is claimed is:

1. A computer apparatus, comprising:

a processor;

a memory communicatively coupled to the processor and storing program instructions causing the processor to:

receive a user-defined query comprising one or more numerical data constraints;

determine the relevancy of the query to each of one or more entries in a computer-searchable electronic index, each of the index entries representing an item of data extracted from at least one of a plurality of electronic source documents, wherein the determining further comprises:

determine a spectral vector for at least a part of the query across the plurality of electronic source documents, the spectral vector comprising a first column of binned numerical values associated with the query and a second column of frequencies of occurrence of the binned numerical values within the plurality of electronic source documents, identify at least one spectral feature comprising a local maximum or local minimum in the frequencies of occurrence within the spectral vector, and limit the computer-searchable electronic index to those documents of the plurality of electronic source documents that are associated with the at least one spectral feature, the relevancy being based on association of documents with the at least one spectral feature;

generate a graph, based on the relevancy determination, comprising a separate data point for each of the index entries determined to be most relevant to the query, wherein a plurality of the most relevant index entries can be extracted from a single one of the source documents; and provide an interactive display of the graph.

2. The apparatus of claim 1, wherein one or more visual characteristics of each point on the graph are correlated with information descriptive of a corresponding index entry.

3. The apparatus of claim 2, wherein the one or more visual characteristics include one or more of color, size, shape, and transparency, and the descriptive information includes one or more of a relevancy score and source document for the corresponding index entry.

4. The apparatus of claim 1, wherein the program instructions further comprise:

identify one or more regions of the graph by one or more clustering algorithms.

5. The apparatus of claim 4, wherein the regions of the graph are each labeled by one or more terms automatically extracted from the source documents.

6. The apparatus of claim 1, wherein the interactive display is responsive to selection of a point on the graph by displaying content from the source document from which the item of numerical data corresponding to the selected point was extracted, at least some of said content located proximate to said item of numerical data within said source document.

7. The apparatus of claim 1, said program instructions further comprising:

in response to interactive selection of a graph data point corresponding to one of the index entries, retrieve at least one source document from which the item of numerical data represented by said index entry was extracted.

8. The apparatus of claim 1, wherein the interactive display is configured to receive user feedback regarding the relevancy determination, and wherein the program instructions further comprise:

in response to the user feedback, modify one or more of: the index, the query, a library of rules used in the determination of relevancy.

9. The apparatus of claim 1, wherein the extracted item of data comprises a unit of measure and a numerical value.

10. The apparatus of claim 1, wherein determining the relevancy of the query further comprises:

determining a topic comparison vector associated with at least part of the query;

performing a comparison between the topic comparison vector and a term frequency vector from the at least one of a plurality of electronic source documents containing each item of data; and determining a global keyword score based on the comparison.

11. The apparatus of claim 1, wherein identify at least one spectral feature further comprises:

determine at least one fitting curve for the spectral vector; and extract at least one center value and at least one width associated with the spectral feature from the at least one fitting curve.

12. A processor-implemented method, comprising:

interactively specifying a query comprising one or more numerical data constraints;

transmitting said query to a remote computing system via a network;

receiving a response to the query via the network from the remote computing system, said response defining a graph comprising a separate data point for each of a plurality of responsive items of numerical data occurring in one or more of a plurality of electronic source documents, said responsive items determined by the remote system to be relevant to the query and wherein a plurality of said relevant items can occur in a single one of the source documents, wherein determining relevance further comprises:

determining a spectral vector for at least a part of the query across the plurality of electronic source documents, the spectral vector comprising a first column of binned numerical values associated with the query and a second column of frequencies of occurrence of the binned numerical values within the plurality of electronic source documents, identifying at least one spectral feature comprising a local maximum or local minimum in the frequencies of occurrence within the spectral vector, and limiting the computer-searchable electronic index to those documents of the plurality of electronic source documents that are associated with the at least one spectral feature, the relevance being based on association of documents with the at least one spectral feature; and interactively displaying the graph.

* * * * *